United States Patent
Achten et al.

(10) Patent No.: US 11,472,101 B2
(45) Date of Patent: Oct. 18, 2022

(54) PROCESS FOR PRODUCING 3D STRUCTURES FROM POWDERED RUBBER MATERIAL AND ITS PRODUCTS

(71) Applicant: Covestro Deutschland AG, Leverkusen (DE)

(72) Inventors: Dirk Achten, Leverkusen (DE); Thomas Büsgen, Leverkusen (DE); Dirk Dijkstra, Odenthal (DE); Bettina Mettmann, Dormagen (DE); Levent Akbas, Witten (DE); Roland Wagner, Leverkusen (DE); Michael Kessler, Cologne (DE)

(73) Assignee: Covestro Deutschland AG, Leverkusen (DE)

( * ) Notice: Subject to any disclaimer, the term of this patent is extended or adjusted under 35 U.S.C. 154(b) by 833 days.

(21) Appl. No.: 16/333,276

(22) PCT Filed: Sep. 15, 2017

(86) PCT No.: PCT/EP2017/073351
§ 371 (c)(1),
(2) Date: Mar. 14, 2019

(87) PCT Pub. No.: WO2018/050859
PCT Pub. Date: Mar. 22, 2018

(65) Prior Publication Data
US 2019/0248067 A1 Aug. 15, 2019

(30) Foreign Application Priority Data
Sep. 16, 2016 (EP) ..................... 16189156

(51) Int. Cl.
| | |
|---|---|
| *B29C 64/153* | (2017.01) |
| *B33Y 10/00* | (2015.01) |
| *B29C 64/165* | (2017.01) |
| *B33Y 80/00* | (2015.01) |
| *B33Y 70/00* | (2020.01) |
| *B29C 64/124* | (2017.01) |
| *B29C 64/245* | (2017.01) |
| *B29C 64/393* | (2017.01) |
| *B33Y 50/02* | (2015.01) |
| *B29B 9/02* | (2006.01) |
| *B29K 7/00* | (2006.01) |
| *B29K 19/00* | (2006.01) |

(52) U.S. Cl.
CPC .......... *B29C 64/153* (2017.08); *B29C 64/124* (2017.08); *B29C 64/165* (2017.08); *B29C 64/245* (2017.08); *B29C 64/393* (2017.08); *B33Y 10/00* (2014.12); *B33Y 70/00* (2014.12); *B33Y 80/00* (2014.12); *B29B 9/02* (2013.01); *B29K 2007/00* (2013.01); *B29K 2019/00* (2013.01); *B33Y 50/02* (2014.12)

(58) Field of Classification Search
CPC ..... B29C 64/153; B29C 64/165; B33Y 70/00; B33Y 80/00
See application file for complete search history.

(56) References Cited

U.S. PATENT DOCUMENTS

| | | | |
|---|---|---|---|
| 6,067,480 A | 5/2000 | Stuffle et al. | |
| 11,192,293 B2* | 12/2021 | Achten | ............... B29C 64/124 |
| 2019/0030794 A1* | 1/2019 | Jiang | ............... B33Y 80/00 |

FOREIGN PATENT DOCUMENTS

| | | |
|---|---|---|
| CN | 103980429 A | 8/2014 |
| CN | 104802415 A | 7/2015 |
| CN | 105504174 A | 4/2016 |
| DE | 102015100816 B3 | 12/2015 |
| EP | 1625952 A1 | 2/2006 |
| EP | 2177557 A1 | 4/2010 |

OTHER PUBLICATIONS

International Search Report for PCT/EP2017/073351 dated Nov. 27, 2017.
Written Opinion of the International Searching Authority for PCT/EP2017/073351 dated Nov. 27, 2017.

* cited by examiner

*Primary Examiner* — Mary Lynn F Theisen
(74) *Attorney, Agent, or Firm* — Jed C. Benson

(57) ABSTRACT

A process is described for producing a three dimensional structure, the process including the following steps a) applying of at least a first material $M_1$ onto a substrate to build a first layer $L_1$ on the substrate; b) layering of at least one further layer $L_y$ of the first material $M_1$ or of a further material $M_x$ onto the first layer $L_1$, wherein the at least one further layer Ly covers the first layer $L_1$ and/or previous layer $L_{y-1}$ at least partially to build a precursor of the three dimensional structure; c) curing the precursor to achieve the three dimensional structure; wherein at least one of the materials $M_1$ or $M_x$ provides a Mooney viscosity of >10 ME at 60° C. and of <200 ME at 100° C. before curing and wherein at least one of the first material Mi or of the further material $M_x$ is a powder. Also, a three dimensional structure is described which is available according to the process according to the invention.

18 Claims, No Drawings

PROCESS FOR PRODUCING 3D STRUCTURES FROM POWDERED RUBBER MATERIAL AND ITS PRODUCTS

CROSS-REFERENCE TO RELATED APPLICATIONS

This application is a national stage application (under 35 U.S.C. § 371) of PCT/EP2017/073351, filed Sep. 15, 2017, which claims benefit of European Application No. 16189156.9, filed Sep. 16, 2016, both of which are incorporated herein by reference in their entirety.

The present invention provides a process for producing a three dimensional structure by applying at least two layers of at least one material $M_1$ or $M_x$ on a substrate to form a precursor and curing the materials, wherein at least one of the materials has a Mooney viscosity of >10 ME at 60° C. and of <200 ME at 100° C. before curing and wherein at least one of the materials $M_1$ or $M_x$ is a powder. The invention further provides a three dimensional structure resulting from the inventive process.

A state of the art apparatus and method for layered deposition of high strength engineering polymers to manufacture durable three-dimensional objects is disclosed in U.S. Pat. No. 6,067,480. Feed rods of the polymer are extruded from an extrusion cylinder using a piston which is displaced into a cylinder, providing high pressure extrusion accommodating polymers having low melt flow and long chain lengths. U.S. Pat. No. 6,067,480 B1 discloses that feed rods of polycarbonate, polyaryletherkotone and poly(methylmethacrylate) were successfully extruded using the extrusion cylinder apparatus. However the described apparatus focuses as a necessary means of extrusion on liquifying a thermoplastic material at temperatures of 185° to above 400° C.

There exists no technology in 3D printing that allows working with materials that are of ultra-high viscosity at room temperature but can be handled as powder during the 3D printing process.

One problem addressed by the present invention was therefore to avoid at least one of the disadvantages of the prior art.

A further problem addressed by the present invention, was to produce a three dimensional structure in diversified geometries which provide a high elasticity combined with a high stability, a high tensile strength or a high elongation before break.

Furthermore, the problem was addressed by the present invention, to provide a material that can be processed without phase change in the liquid state.

A further problem addressed by the present invention, was to provide a material that (chemically) cured to a temperature shape stable rubbery material during and after processing without losing the intended shape achieved in a suitable 3D printing process.

Furthermore, a problem addressed by the present invention was to provide a material for a 3D printing process that allows for the production of rubbery material in dimensions below 1 mm in at least one spatial direction.

A further problem addressed by the present invention was to provide a three dimensional structure material in a 3D printing process formed at least partly from a rubbery material.

At least one of the mentioned problems is solved by the feature combination described in the claims. A first aspect of the invention is a process for producing a three dimensional (3D) structure, the process including the following steps a) applying of at least a first material $M_1$ onto a substrate building a first layer $L_1$ on the substrate;
b) layering of at least one further layer $L_y$ of the first material $M_1$ or of a further material $M_x$ onto the first layer $L_1$, wherein the at least one further layer $L_y$ covers the first layer $L_1$ and/or previous layer $L_{y-1}$ at least partially to build a precursor of the three dimensional structure;
c) curing the precursor to achieve the three dimensional structure;

wherein at least one of the materials $M_1$ or $M_x$ provides a Mooney viscosity of >10 ME at 60° C. and of <200 ME at 100° C. before curing and wherein at least one of the materials, the first material $M_1$ or the further material $M_x$ is a powder. Preferably, x ranges from 2 to 100, or preferably from 2 to 50, or preferably from 2 to 20.

Preferably, y ranges from 2 to 100000, or preferably from 3 to 50000, or preferably from 4 to 20000, or preferably from 5 to 10000, or preferably from 10 to 5000, or preferably from 10 to 100000.

The Mooney viscosity is measured according to DIN 53523.

Preferably, the first material $M_1$ provides a Mooney viscosity of >20 ME at 60° C. and of <200 ME at 100° C. before curing, or >30 ME at 60° C. and of <200 ME at 100° C. before curing, or >50 ME at 60° C. and of <200 ME at 100° C. before curing. Preferably, the first material $M_1$ provides a Mooney viscosity of >20 ME at 60° C. and of <190 ME at 100° C. before curing, or >30 ME at 60° C. and of <180 ME at 100° C. before curing, or >50 ME at 60° C. and of <170 ME at 100° C. before curing. Preferably, the further material $M_x$ provides a Mooney viscosity of >20 ME at 60° C. and of <200 ME at 100° C. before curing, or >30 ME at 60° C. and of <200 ME at 100° C. before curing, or >50 ME at 60° C. and of <200 ME at 100° C. before curing. Preferably, the further material $M_x$ provides a Mooney viscosity of >20 ME at 60° C. and of <190 ME at 100° C. before curing, or >30 ME at 60° C. and of <180 ME at 100° C. before curing, or >50 ME at 60° C. and of <170 ME at 100° C. before curing.

By the inventive process the use of ultra-high viscosity liquid materials in form of a powder in additive manufacturing is enabled. Ultra-high viscosity liquids according to the invention are liquids with a viscosity higher than $10^6$ mPas, measured at 25° C. by an oscillatory shear viscosimeter at a shear rate of 1/s. Preferably, no phase transition of any of the materials $M_1$ or $M_x$ is involved during any of the process steps a) to c), or preferably during steps a) and b). The three dimensional structure preferably shows no phase transition above 50° C., or preferably above 25° C. (RT), or preferably above 10° C. Preferably, the resulting three dimensional structure is temperature shape stable. Temperature shape stable according to the invention means that the shape of the three dimensional structure does not alter in any dimension X, Y or Z more than 10%, or preferably not more than 15%, or preferably not more than 20% compared to the original shape in these directions when applied to elevated temperatures. Elevated temperatures means preferably temperatures in a range of from 40 to 400° C., or preferably in a range of from 50 to 350°, or preferably in a range of from 60 to 300° C. Preferably, the three dimensional structure does not alter its extension in any of the dimensions X, Y or Z of more than 20 mm, or preferably of more than 15 mm, or preferably of more than 10 mm during its shelf-life at room temperature (25° C.) and normal pressure (1013 mbar) if no further forces are applied to the three dimensional structure. The shelf-life of a three dimensional structure according to the invention is expected to be at least 1 year, or preferably at least 5 years, or preferably at least 10 years. The three dimensional structure preferably is highly mechanically stable after full curing and comprises a temperature dependent modulus of elasticity, also called E'-modulus or modulus E'. Preferably, the loss of the E'-modulus, also called modulus of the cured material $M_{1c}$ or $M_{xc}$ provided by a comparison of the E'-modulus at a temperature of 25° C. to the E'-modulus at a temperature of 200° C. is less than 80%, or preferably less than 70%, or preferably less than 60%. This behavior is as expected for materials with a distinct rubber plateau between 25° C. and 200° C.

The applying step a) can be performed by any method the person skilled in the art would select for applying the first material $M_1$ to a substrate. The applying step a) preferably is performed by an application tool. The application tool can be any tool the person skilled in the art would select for applying the first material $M_1$ to a substrate or layering the further material $M_x$ onto the previous layer $L_{y-1}$, preferably in a defined way.

As at least one of the materials $M_1$ or $M_x$ is applied in form of a powder, any application method for applying a powder may be used that allows the application of the powder to the surface. Known methods for applying powders in a precise manner are known from additive manufacturing processes like SLS (selective laser sintering), as described in "Additive Manufacturing Technologies", by I. Gibson et. al., Springer Verlag 2012, ISBN-978-1-4939-2112-6. Preferably, two different ways of applying the materials $M_1$ or $M_x$ are used.

In a first preferred application method the powder is applied to an area of a platform being part of a building device in a laminar form to build any of the layers $L_1$ to $L_y$. To form the precursor of the three dimensional structure in this first preferred application method a part of the powder of the first layer $L_1$ or $L_y$ is structured in a way that at least a part of the powder particles form agglomerates. Ways to form these agglomerates are described in detail later.

In a second preferred application method the powder is applied to the platform of the building device in a space-resolved manner. To form the precursor of the three dimensional structure in this second preferred application method the powder particles are handled during application or directly after application in a manner that the particles form aggregates to build the precursor in form of the first layer $L_1$ and any of the precious layers $L_y$ directly after having reached the platform. The handling during application of the powder preferably is established by heating via heating means of the particles to a temperature where at least a part of the material $M_1$ or $M_x$ becomes sticky. The stickiness is preferably sufficient to fix the position of the powder particles to each other when reaching the platform or the previous layer $L_{y-1}$.

The material $M_1$ or $M_x$ can be provided as a powder by grinding at least a part of the raw materials of $M_1$ or $M_x$ in a suitable grinding process. Preferably, the grinding of at least one component of the materials $M_1$ or $M_x$ as used in the application step a) or in the layering step b) is a cryogenic grinding. Cryogenic grinding, also known as freezer milling, freezer grinding, and cryomilling, is the act of cooling or chilling a material and then reducing it into a small particle size. Preferably, cryogenic grinding is performed at temperatures below 20° C., or preferably below 10° C., or preferably below 0° C. The cryogenic grinding of the material $M_1$ or $M_x$ is preferably performed at a temperature of $<T_g$ of the material $M_1$ or $M_x$, or preferably of at least 10° C. below Tg of the material $M_1$ or $M_x$, or preferably of at least 20° C. below Tg of the material $M_1$ or $M_x$. When talking about a cryogenic grinding of any of materials $M_1$ or $M_x$, a formulation is meant which at least comprises a rubber component as one raw material, which is selected from the group consisting of a natural rubber, a synthetic rubber or a mixture thereof. The rubber component can also be called a rubber compound. Alternatively, the cryogenic grinding could preferably be established with the formulation of at least two or preferably of at least three or preferably of all components of the utilized materials $M_1$ or $M_x$. In case at least a part of the components of $M_1$ or $M_x$ are ground separately, the powders of all components are mixed together after the cryogenic grinding of the rubber component. At least the rubber component provides a glass transition temperature Tg and a melting point or melting phase Tm. The glass-transition temperature Tg of a material characterizes the range of temperatures over which this glass transition occurs. It is always lower than the melting temperature, Tm, of the crystalline state of the material, if one exists.

Preferably, at least the part of the powder material $M_1$ or $M_x$ that is cryogenically ground is the result of a process that delivers powder materials directly from a dispersion or solution of rubbery materials in a solvating or non-solvating liquid, like a precipitation process or a spray drying process.

Preferably, at least the part of the powder material $M_1$ or $M_x$ that is cryogenically ground is the result of a grinding process starting from already formulated and crosslinked rubber compounds e.g. as result of a recycling process of used rubber materials.

Preferably, the average diameter of the particles, also called particle size, of the material $M_1$ or $M_x$, is in a range of from 0.005 to 2 cm, or preferably in a range of from 0.007 to 1 cm, or preferably in a range of from 0.01 to 0.7 cm. Preferably, the particle size distribution $D_{50}$ of the material $M_1$ or $M_x$ is in a range of from 0.005 to 1 cm, or preferably in a range of from 0.01 to 0.5 cm. In a preferred embodiment of the process the average aspect ratio of the particles of the material $M_1$ or $M_x$ is <10, or preferably <5 and or preferably <3. Preferably, the particles of the material $M_1$ or $M_x$ have a spherical shape. A spherical particle or powder can be described by a mathematical equation with ≤3 variables. Preferably, grinding of the materials $M_1$ or $M_x$ takes place via grinding and/or cutting processes using means selected from the group consisting of pencil mill, ball mill, impact mill, gap mill, cutting mill, high energy ball mill or combinations of at least two thereof. Preferably, the grinding is established with stripes or granules of the material $M_1$ or $M_x$. The stripes or granules preferably have a dimension in a range of from 0.5 to 100 cm³, or preferably in a range of from 0.7 to 50 cm³, or preferably in a range of from 1 to 20 cm³.

As the material $M_1$ or $M_x$ may comprise more than one component, the components either can be mixed or compounded before the grinding step or during the grinding step or after the grinding step of the rubber component. Preferably, all components of the material $M_1$ or $M_x$ have a particle size distribution as mentioned above for the material $M_1$ or $M_x$.

Preferably, the yield of the cryogenic grinding process is >10 wt.-%, or preferably >20 wt.-%, or preferably >30 wt.-%, based on the total weight of the material to be ground. The separation of ground material from unground material is preferably established by sieving. Particles may be easily separated by mechanical sieving processes to gather the right particle sizes. In a preferred separation process the selection of the right particle sizes of the ground material is achieved via a co-extrusion or droplet extrusion or melt spinning or spray drying or by rapid expansion of supercritical solution RESS (as described in "Selektive Lasersintern (SLS) mit Kunststoffen, Technologie, Prozesse and Werkstoffe" by Manfred Schmid, www.hanser-fachbuch.de Auflage 2015) preferably starting from the uncompounded ultra-high viscosity liquid. In these cases the formulation of the material $M_1$ or $M_x$ preferably takes place after powder particle generation.

Preferably, consecutively to the grinding of at least one component of the material $M_1$ or $M_x$ the ground material is treated by an additive. Preferably, the treatment of the ground material with the additive is a "coating" of the powder received from cryogenic grinding. By "coating" of the powder a modification of the powder surface properties is understood. The "coating" of the ground material has the aim to improve the powder flow behavior and/or pressure related sticking behavior of the received powder. Preferably, the "coating" is performed after grinding of all components of the material $M_1$ or $M_x$ separately or together and optionally mixing or compounding of all the components of $M_1$ or $M_x$ to achieve the first material $M_1$ or the further material $M_x$ to be applied or layered in steps a) or b). There exist various "coating" technologies based on organic and/or inorganic materials which are well known to the person skilled in the art. Typical examples of additives for "coating" are natural waxes, PE wax emulsions, high surface area silica, talcum, glass balls/fibres, carbon black powder/fibers. Preferably, the different components of the material $M_1$ or $M_x$ are provided as powders with different average diameters which are mixed or compounded before use in step a) or b). Preferably, the additives for "coating" act against sticking and for improvement of flow behavior. Preferably, the material for "coating" the powder particles which comprise at least the rubber component are significantly smaller in diameter than the powder particles themselves and form a so called "pickering" layer of non-coalescing smaller particles on the surface of a larger rubber particle such modifying the particle stability as well as the powder rheological and sticking behavior of the larger particle.

In a preferred embodiment the resulting powder forming the material $M_1$ or $M_x$ has a powder density of >0.4 preferably >0.6 or preferably >0.8 kg/l. Preferably, the powder is dry before use. Preferably, the material $M_1$ or $M_x$ comprises less than 1 wt.-%, or preferably less than 0.5 wt.-%, or less than 0.1 wt.-% of water, based on the total weight of the material $M_1$ or $M_x$. The water content has been measured according to Karl-Fischer titration (for details see Wieland, G.: Wasserbestimmung durch Karl-Fischer-Titration, GIT Verlag GmbH, Darmstadt, 1985). Preferably, the Hausner Factor as a quotient of stamping density and pouring density of the powder material $M_1$ or $M_x$ is ≤1.5. The parameter of the pouring density is measured according to ISO 697:1981, and of the parameter of the stamped density is measured according to ISO 787-11:1981.

According to the invention, the powder is applied to the surface in form of layers $L_1$ to $L_y$. The at least two layers $L_1$ to $L_y$ preferably comprise the same material $M_1$. In the case that different layers $L_1$ to $L_y$ comprise different materials $M_1$ to $M_x$ it is preferred that these different materials have different mean particle sizes. Preferably, the particle sizes of the different materials $M_1$ to $M_x$ differ in a range of from 1.1 to 10 fold, or preferably in a range of from 1.2 to 7 fold, or preferably in a range of 1.3 to 5 fold, based on the material $M_1$ to $M_x$ with the smallest medium particle size.

Preferably, the layers of the materials $M_1$ to $M_x$ are applied to the surface in form of lines or spots. Preferably, at least parts of different layers $L_1$ to $L_y$ are applied simultaneously. Preferably, the thickness of at least one of the layers $L_1$ to $L_y$ is in a range of from 0.1 mm to 5 cm, or preferably in a range of from 0.3 mm to 2 cm, or preferably in a range of from 0.5 to 10 mm. Preferably, the thickness of each of the layers $L_1$ to $L_y$ is in a range of from 0.01 mm to 5 cm, or preferably in a range of from 0.03 mm to 2 cm, or preferably in a range of from 0.05 to 10 mm. Preferably, applying or layering of the materials $M_1$ to $M_x$ in form of layers $L_1$ to $L_y$ is selected from the group consisting of roller coating, knife coating, spray application, electrostatic application, powder jetting, valve jet application, vibrational layering, screen printing, sieving application or a combination of at least two thereof. Furthermore, any other known application technology for powders known to the person skilled in the art or combinations thereof onto any two dimensional or three dimensional substrate may be used. In a preferred embodiment the powder has a bimodale or multimodale particle size distribution with an average particle size distribution of ≥1.5, based on the particle size of the smallest particle size maximum.

Typical cryogenic grinding procedures and machines are state of the art e.g. described in "Selektive Lasersintern (SLS) mit Kunststoffen, Technologie, Prozesse and Werkstoffe" by Manfred Schmid, www.hanser-fachbuch.de Auflage 2015. Preferably, the cryogenic grinding temperature of the grinding process of the at least one component of the material $M_1$ or $M_x$ is typically at least 10° C., or preferably at least 20° C., or preferably at least 30° C. below Tg of the compounded material $M_1$ to $M_x$. Preferably, the cryogenic grinding temperature of the grinding process of the at least one component of the material $M_1$ or $M_x$ is in a range of from 10° C. to 50° C., or preferably in a range of from 20° C. to 50° C., or preferably in a range of from 30° C. to 50° C. below Tg of the compounded material $M_1$ to $M_x$.

In a preferred embodiment of the process, the resulting powder material will be post treated with further formulation ingredients like organic and/or inorganic fillers and/or surface active agents. Preferably, the material $M_1$ or $M_x$ comprise the further formulation ingredients in an amount in a range of from 0.1 to 80 wt.-%, or preferably in a range of from 0.5 to 50 wt.-%, or preferably in a range of from 1 to 30 wt.-%, or preferably in a range of from 1 to 10 wt.-%, based on the total weight of the corresponding material $M_1$ or $M_x$. The further formulation ingredients have mainly the function of supporting the stability of the formulated powdered ultra-high viscosity liquid against baking and sintering together prematurely under its own pressure during storage of the material $M_1$ or $M_x$. Suitable materials for that purpose are well known to the art in rubber formulation and also in food industry. Examples are waxes, silicones, soaps, talcum, silica, carbon black, fibers to name a few. In a preferred embodiment of the invention these powder stabilizers do not impact the processing properties of the powder in the inventive 3D printing process. Preferably, the powder is stored below RT (25° C.) and at low pressure (below 1013 mbar) e.g. by packaging in (boxed) containers containing less than 50 kg, preferably less than 20 kg, or preferably less than 10 kg powder before use in the process according to the invention. Preferably, the Hausner Factor of the powder material $M_1$ or $M_x$ compounded with the further formulation ingredients is ≤1.5.

Preferably, the process for producing the three dimensional structure is achieved by a layer by layer process in combination with or followed by an attachment process of at least a part of the particles of the powder material $M_1$ or $M_x$.

Examples of the attachment process are selective gluing and/or selective sintering of the formulated ultra-high viscosity powder material $M_1$ or $M_x$. Preferably, the attachment process includes a selective attachment step a') and/or a step b'). In step a') at least a part of the powder particles of the powder material $M_1$ that is applied to the substrate in step a) is selectively attached to each other by applying energy via energy application means to the selected part of the powder material $M_1$ before, during or after the powder material $M_1$ has been applied to the substrate or to the previous layer $L_{y-1}$. In step b') at least a part of the powder particles of the powder material $M_x$ that has been layered onto the first layer $L_1$ or a previous layer in step b) is selectively attached to each other, especially to its neighboring powder particles, by applying energy via energy application means to the selected part of the powder material $M_x$. The applying of energy to the selected part of powder material $M_x$ is preferably applied before, after or during the layering in step b). This part of the process is also called selective attachment of the powder particles. In the course of the attachment process agglomerates of powder particles are formed.

In case the selected part of particles is treated by applying energy to form agglomerates before or during applying step a), the part of the powder particles of the materials $M_1$ or $M_x$ that are selectively attached is in a range of from 80 to 100 wt.-%, or preferably in a range of from 85 to 98 wt.-%, or preferably in a range of from 90 to 95 wt.-%, based on the total mass applied to the substrate to form the respective layers $L_1$ to $L_y$.

In case the treatment of the powder material $M_1$ or $M_x$ by energy for selective attachment is performed after the material $M_1$ or $M_x$ has been applied, the amount of the part of the powder particles of the materials $M_1$ or $M_x$ that are selectively attached is preferably in a range of from 0.1 to 95 wt.-%, or preferably in a range of from 1 to 90 wt.-%, or preferably in a range of from 2 to 80 wt.-%, or preferably in a range of from 3 to 70 wt.-%, or preferably in a range of from 4 to 50 wt.-%, or preferably in a range of from 5 to 40 wt.-%, based on the total mass applied to the substrate to form the respective layers $L_1$ to $L_y$.

Preferably, in the course of the selective attachment of the powder particles at least a part of the powder particles belonging to one layer $L_1$ or $L_y$ are attached to at least a part of powder particles belonging to a neighboring layer $L_1$ or $L_{y-1}$.

The gluing may be achieved by any glue the person skilled in the art would select for the process. Preferably, the glue is reactive or nonreactive. In case of the utilization of a reactive glue a chemical bond is formed between the glue and any of the components of the materials $M_1$ or $M_x$, or between different glue molecules. The gluing process is preferably initiated by an initiating process in form of for example applying heat or irradiation or both to any layer of the layers $L_1$ to $L_y$. Preferably, the glue is part of the material $M_1$ or $M_x$. Alternatively or additionally, the glue is applied separately from the material $M_1$ or $M_x$ to any of the layers $L_1$ to $L_y$. Preferably, by gluing the layers $L_1$ to $L_y$, an attachment of the powder particles via rigid or elastic bonds with a module in a range of from 0.5 to 5000 MPa, or preferably in a range of from 1 to 2000 MPa, or preferably in a range of from 5 to 1000 MPa is achieved. The glue may contain solvents in a range of from 0 to 90 wt.-%, or preferably in a range of from 0 to 70 wt.-%, or preferably in a range of from 0 to 50 wt.-%, based on the total mass of the glue formulation. By initiating the gluing process, preferably a short time or a permanent viscosity decrease of up to 90% of the powder material, compared to the viscosity of the powder material before initiating the gluing, is achieved. By decreasing the viscosity of the powder material, preferably a powder particle to powder particle attachment is achieved. Furthermore, the decrease of viscosity preferably causes swelling of the layers $L_1$ to $L_y$, washing away of processing aids, activating particle to particle adhesive or increasing crosslinking activities between different components of the material $M_1$ or $M_x$. These effects are preferably achieved by applying an actinic radiation or other heat induced energy input. Preferably, the amount of applied glue during the inventive process is in the range of from 0 to 50 wt.-%, or preferably in a range of from 0 to 30 wt.-%, or preferably in a range of from 0 to 25 wt.-% percent, based on the total mass of the material $M_1$ to $M_x$. Preferably, the energy input to achieve selective attachment of the powder particles is caused by excessive heat induced by a high powered temporary IR area flash and/or a focused laser impulse. Preferably, the energy application means is selected from the group consisting of an IR laser, an IR beam, IR diode, a UV laser, a UV beam, a UV lamp, a UV diode, a VIS lamp, a VIS diode range or a combination of at least two thereof.

A selective attachment of the powder particles by sintering is preferably achieved by applying excessive heat to the selected part of powder particles induced by a high powered temporary IR area flash and/or a focused laser impulse. Preferably, the selective attachment of the powdered ultra-high viscosity material to build the three dimensional structure is performed simultaneously or before the curing step c). Preferably, the maximum temperature induced in the powder particles in the selective attachment step a') or b') is in a range of from 50 to 400° C., or preferably in a range of from 60 to 350° C., or preferably in a range of from 70 to 300° C., or preferably in a range of from 80 to 250° C.

Preferably, the final curing in step c) is performed after the selective attachment step a') or b') at a temperature in a range of from 50° C. to 250° C., or preferably in a range of from 80° C. to 200° C., or preferably in a range of from 100° C. to 180° C. The temperature of above 50° C. in step c) is preferably applied until at least 60% of final cure, or preferably 80% of final cure, or preferably 90% of final cure is reached. The curing degree depending on the curing time and temperature is preferably determined by comparison of the rotational force value of a powder sample cured under intended temperature and time with the peak rotational force value of a fully cured powder sample cured on a rotational Vulkarheometer like the Visco-Elastograph from Göttfert at 200° C. Exemplary machines useful for the sintering process of powdered ultra-high viscosity RT fluids can be purchased from EOS, Farsoon, ExOne, Voxeljet, HP to name but a few.

Preferably, at least step a) and step b) are performed in a building volume of a machine which has the ability to apply and layer the materials in step a) and b). Preferably, the building volume has a dimension which is at least the dimension of the three dimensional structure to be built in it. Preferably, the building volume comprises a building platform where the substrate is positioned on or which itself builds the substrate where the at least the first material $M_1$ is applied to. Preferably, the building volume is defined by the volume formed by the platform together with at least one wall surrounding the platform. Preferably, the average temperature of the first material $M_1$ or any of the further materials $M_x$ in the building volume is below 150° C., or preferably below 100° C., or preferably below 50° C., or below 25° C., or preferably RT (about 25° C.), or preferably below 10° C. at least during steps a) and b). Preferably, the building volume is not heated by an additional heating means in addition to the energy application means used in steps a') or b').

Preferably, the curing step c) takes place outside of the building volume.

Preferably, at least one of the materials $M_1$ or any of the further materials $M_x$ also contain thermoplastic powders and or reactive powders and or inorganic powders. The first material $M_1$ or any of the further materials $M_x$ comprises the thermoplastic, reactive or inorganic powders in a range of from 0.1 to 30 wt.-%, or preferably in a range of from 0.2 to 20 wt.-%, or preferably in a range of from 0.5 to 15 wt.-%, based on the total mass of the powdered first material $M_1$ or further material $M_x$.

Preferably, the building rate of the precursor is >20 g/h, or preferably >30 g/h, or preferably >50 g/h, or preferably in a range of from 10 to 10000 g/h, or preferably in a range of from 15 to 1000 g/h, or preferably in a range of from 20 to 500 g/h.

The thickness of the applied first material $M_1$ or any of the further materials $M_x$ at its narrowest point of the respective layer is preferably in a range of from 0.01 mm to 100 mm, or preferably in a range of from 0.05 mm to 10 mm, or preferably in a range of from 0.1 mm to 1 mm.

Preferably, layering step b) is performed in the same manner as applying step a) with the difference that the further material $M_x$ is not applied directly onto the substrate but at least partially onto the first layer $L_1$.

Preferably, the applying of the first material $M_1$ or of the further material $M_x$ is selected from the group consisting of spreading, spraying, printing, pouring and trickling of material in form of a powder layer or a combination of at least two thereof by the application tool. Preferably, the material $M_1$ or $M_x$ is applied via the application tool by spreading the material via rolls or blades. Preferably, the application tool, has an incorporated material heating and or cooling device, for example in the form of a heating or cooling chamber. Preferably, the first material $M_1$ or the further material $M_x$ is kept in the heating or cooling device at the processing temperature for a minimum time of 0.1 second and a maximum time of 5 times the time needed to build the intended three dimensional structure. The processing temperature according to the invention is the temperature of the material $M_1$ or $M_x$ when applied in step a) or layered in steps b). Preferably, the processing temperature is the highest temperature which is applied to the material $M_1$ or $M_x$ during the process steps a) and b).

For the formation of a three dimensional structure with y further layers $L_y$ with y ranging from 2 to 100000, step b) is repeated y−1 times. Preferably, each further layer $L_y$ is superimposed on at least a part of the previous layer $L_{y-1}$. For the building of the precursor of the three dimensional structure step b) is repeated as often as needed to form the final number of layers building the three dimensional structure is reached. In a preferred embodiment of the process, the application step a) and the at least one layering step b) are performed in a continuous manner or nearly continuous manner. Preferably, the material of the plurality of layers $L_1$ to $L_y$ is selected from the same material $M_1$. Alternatively, material $M_1$ differs from at least one of the further materials $M_x$ by at least one ingredient. In a preferred embodiment of the process, at least one layer selected from the group consisting of $L_1$ to $L_y$ is formed in step a) or step b) by utilizing at least two different materials $M_1$ to $M_x$.

In a preferred embodiment of the invention, at least a part of the applying step a) or the layering step b) or both are performed at a temperature where the Mooney viscosity of the first material $M_1$ or the further material $M_x$ is reduced by at least 50%, or preferably by at least 60%, or preferably by at least 70% compared to the Mooney viscosity of these materials at 60° C. Preferably, at least one of the steps, the applying step a) or the layering step b) or both are performed at a material temperature in a range of from 70 to 250° C.

In step b) the further layer $L_y$ preferably superimposes the first layer $L_1$ or $L_{y-1}$ to an extent ranging from 1% to 100%, or preferably from 5% to 100%; or preferably from 10% to 100%; or preferably from 15% to 100%; or preferably from 20% to 100%, or preferably from 25% to 100% related to the total surface of the first layer $L_1$ or the previous layer which is not in contact with any previous layer. Preferably, the first layer $L_1$ is in direct contact with the further layer $L_y$. Preferably, step b) comprises at least 10, or preferably at least 50, or preferably at least 100, or preferably at least 1000, or preferably at least 100000 further layers $L_y$. In the context of the invention the previous layer $L_{y-1}$ can be the first layer $L_1$ or any further layer $L_{y-1}$, where the further layer $L_y$ is layered upon.

The substrate where the first layer $L_1$ is applied to can be any substrate the person skilled in the art would select to form a three dimensional structure on. Preferably, the substrate has at least one surface where the layers $L_1$ to $L_y$ are applied on. Preferably, the material of the substrate is selected from the group consisting of a metal, a polymer, a ceramic, a glass, a wood or a combination of at least two thereof. Preferably, the surface comprises a material selected from the group consisting of iron, preferably steel, a glass preferably Silkate or Borosilikate based, a polymer with release properties like silicones, polyimides, perfluorated materials etc. In a preferred embodiment of the process, the substrate is an intended part of the desired 3D structure and is selected from the group consisting of a metal, a polymer, a ceramic, a glass, a wood or a combination of at least two thereof. Preferably, the substrate comprises a metal or a polymer. The surface of the substrate preferably is flat in a sense that the surface has a roughness of below 5 mm. In a preferred embodiment of the process, the surface is a plane with a curvature radius >5 cm at least in the area where the first layer $L_1$ is applied to. Preferably, the dimension of the surface is larger than the surface of at least the first layer $L_1$ being in contact with the surface. The shape of the substrate can be any shape the person skilled in the art would select for producing a three dimensional structure. Preferably, the shape of the surface of the substrate is selected from the group consisting of round, oval, angular, polygonal or a combination of at least two thereof. The size of the surface of the substrate is preferably in a range of from 1 cm² to 100 m², or preferably in a range of from 10 cm² to 50 m², or preferably in a range of from 1 m² to 20 m².

In a preferred embodiment the substrate is part of a formation tool. Preferably, the formation tool is formed as a box with at least one vertical wall. The at least one wall may comprise any material the person skilled in the art would use to form the boundary of a formation tool. Preferably, the substrate is part of a platform which is arranged to be movable along the at least one vertical wall. The substrate may be removable from the platform or alternatively may be an integrated part of the platform. By moving the platform along the at least one vertical wall the volume of the building volume can be varied. Preferably, the at least one wall together with the substrate build the building volume for the three dimensional structure. Preferably, the building volume is heatable and or coolable. Preferably, the volume of the building volume can be varied in a range of from 0 to 1000 m³, or preferably in a range of from 0.01 to 500 m³, or preferably in a range of from 0.05 to 100 m³, or preferably in a range of from 0.1 to 50 m³. The applying in step a) or the layering in step b) may be performed directly on the surface of the substrate. Alternatively or at least partially additionally, an interlayer may be placed onto the surface onto which the first material $M_1$ is applied. Preferably, only the first material $M_1$ comes into direct contact with the substrate or the interlayer, however depending on the geometry of the three dimensional structure to be build, also at least a part of further layers may come into contact with the substrate or the interlayer. The interlayer may comprise any material the person skilled in the art would choose to be an appropriate surface to apply the first material $M_1$ onto. Preferably, the interlayer is made from glass, paper, textile, fabric, ceramic, stone, wood, metal, polymer, plastic, rubber or any combination of at least two thereof. The interlayer preferably becomes part of the three dimensional structure or alternatively may at least partly be separated from the three dimensional structure after the building of the precursor or after the curing step c). The potential separation of the three dimensional structure from the interlayer or from the substrate preferably is performed before step c) when the precursor has been built or after the curing step c) when the three dimensional structure has been built.

In a preferred embodiment of the process the surface of the substrate or the interlayer is part of the three dimensional structure. In an alternatively preferred embodiment, the substrate or the interlayer is not part of the three dimensional structure.

The first material $M_1$ can be any material providing a Mooney viscosity of >10 ME at 60° C. and of <200 ME at 100° C. before curing. The further material $M_x$ can be any material providing a Mooney viscosity of >10 ME at 60° C. and of <200 ME at 100° C. before curing.

The Mooney viscosity is measured according to DIN 53523, with the large rotor, 1 min preheating and 4 min measurement interval. (ML 1+4).

Preferably, the first material $M_1$ or the further material $M_x$ comprises a component, which hereinafter is referred to as "ultra-high viscosity liquid" selected from the group consisting of a natural rubber, a synthetic rubber or a mixture thereof. Preferably, the first material $M_1$ comprises the ultra-high viscosity liquid in an amount in a range of from 10 to 100 wt.-%, or preferably in a range of from 15 to 98 wt.-%, or preferably in a range of from 20 to 95 wt.-%, or preferably in a range of from 30 to 90 wt.-%, based on the total weight of the first material $M_1$. Preferably, the further material $M_x$ comprises the ultra-high viscosity liquid in an amount in a range of from 10 to 100 wt.-%, or preferably in a range of from 15 to 98 wt.-%, or preferably in a range of from 20 to 95 wt.-%, or preferably in a range of from 30 to 90 wt.-%, based on the total weight of the further material $M_x$.

The synthetic rubber is preferably selected from the group consisting of Thiocol Rubber, EVA (Ethylene Vinyl Acetate Copolymer rubber), FPVC (Flexible Polyvinyl Chloride rubber), FZ rubber (Fluorinated Polyphosphazene Rubber), GPO (Propylene Oxide rubber), HNBR (Hydrogenated Nitrile Butadiene rubber), HSN (Highly Saturated Nitrile rubber), ACM (Acrylic rubber), VAMAC (Polethylen co acrylic-acrylic acid rubber), PNR (Polynorborane rubber), PZ (Polyphosphazene rubber), ABR (Acrylate-butadiene rubber), ACM rubber (Copolymer of ethyl or other acrylates and a small amount of a monomer which facilitates vulcanization), AECO rubber (Terpolymer of allyl glycidyl ether, ethylene oxide and epichlorhydrin), AEM rubber (Copolymer of ethyl or other acrylate and ethylene), AFMU rubber (Terpolymer of tetrafluoroethylene, trifluoronitromsomethane and nitrosoperfluorobutyric), ANM rubber (Copolymer of ethyl or other acrylate and acrylonitrile), AU (Polyester urethane rubber), BIIR (Bromo-isobutene-isoprene rubber (brominated buytl rubber)), BR (Butadiene rubber), CFM (Polychlorotrifluoroethylene rubber), CIIR (Chloro-isobutene-isoprene rubber (chlorinated rubber)), CM (Chlorinated polyethylene rubber), CO (Epichlorhydrin rubber), CR (Chloroprene rubber), CSM (Chlorosulphonated polyethylene rubber), ECO (Ethylene oxide and epichlorhydrin copolymer rubber), EAM (Ethylene-vinyl acetate copolymer rubber), EPDM (Terpolymer of ethylene, propylene and a diene with the residual unsaturated portion of the diene in the side chain rubber), EPM Ethylene-propylene copolymer rubber), EU (Polyether urethane rubber), FFKM (Perfluoro rubber of the polymethylene type having all substituent groups on the polymer chain either fluoro, perfluoroalkyl or perfluoroalkoxy groups), FKM (Fluororubber of the polymethylene type having substituent fluoro and perfluoroalkoxy groups on the main chain), FVMQ (Silicone rubber having fluorine, vinyl and methyl substituent groups on the polymer chain), GPO (Polypropylene oxide rubber), IIR (Isobutene-isoprene rubber (butyl rubber)), IM (Polyisobutene rubber), IR (Isoprene rubber (synthetic)), MQ (Silicone rubber having only methyl substituent groups on the polymer chain), NBR (Nitrile-butadiene rubber (nitrile rubber)), NIR (Nitrile-isoprene rubber), PBR (Pyridine-butadiene rubber), PMQ (Silicone rubber having both methyl and phenyl groups on the polymer chain), PSBR (Pyridine-styrene-butadiene rubber), PVMQ (Silicone rubber having methyl, phenyl and vinyl substituent groups on the polymer chain), Q (Rubber having silicone in the polymer chain), SBR (Styrene-butadiene rubber), T (Rubbers having sulphur in the polymer chain (excluding copolymers based on CR)), VMQ (Silicone rubber having both methyl and vinyl substituent groups in the polymer chain), XNBR (Carboxylic-nitrile butadiene rubber (carboxynitrile rubber)), XSBR (Carboxylic-styrene butadiene rubber).

Preferably, the first material $M_1$ or the further material $M_x$ comprises a component which is selected from the group consisting of Polyacrylic Rubber (ACM), Styrene Butadiene Rubber (SBR), Polysiloxane (SI), Vinyl Methyl Silicone (VMQ), Nitrile rubber (NR), hydrogenated nitrile rubber, (HNBR), carboxylated Nitrile rubber (XNBR), carboxylated hydrogenated Nitrile rubber (XHNBR), Ethylenpropylen copolymer rubber (EPDM), Polychloroprene rubber (CR), Vamac, Fluoro rubber FKM), Isobutylen rubber (IIR), Polybutadiene rubber (BR) or any mixtures or blends of at least two of these.

Preferably, the first material $M_1$ or the further material $M_x$ in form of the powder has a degree of crystallinity of below 20%, preferably of below 15%, or preferably of below 10%, or preferably of below 5%, based on the total amount of the respective material $M_1$ or $M_x$. Preferably, the powder has a melting point Tg of below 50° C., or preferably of below 40° C., or preferably of below 30° C. The powder shows an observable flow at room temperature under pressure <20 bar, or preferably <10 bar, or preferably <5 bar. Preferably, the powder loses its crystallinity upon processing with heat or shear below 50° C. Furthermore, the ultra-high viscosity liquids have compared to standard thermoplastic materials a very slow buildup of crystallinity to a steady state that may take more than 2 hours, preferably more than 4 hours, or preferably more than 8 hours since the melting point $T_m$ is very close to room temperature RT (25° C.). Specific examples of ultra-high viscosity liquids showing this behavior are Natural rubber and particularly Polychloroprene rubber types with high trans orientation of the chlorine e.g., the products of the Baypren 200 and 300 series of Lanxess AG.

Preferably, the first material $M_1$ or any of the further materials $M_x$ comprise an ultra-high viscosity polymer and preferably at least one of the components selected from the group consisting of an organic or inorganic filler, a plasticizer, a metal oxide, anti-degradents (against, oxidation, hydrolysis, yellowing, ozone attack etc.), process aids, a coagent and a curative or a combination of at least two thereof. Examples for the filler, plasticizer, metal oxide, anti-degradent, process aid, coagent or curative are listed below. Examples for an inorganic filler are Carbon black N330 or silica, for a plasticizer are phthalate esters like dioctylphathalate, for a metal oxide is ZnO, for an anti-degradent is Irganox 1010 ((Pentaerythritol Tetrakis(3-(3,5-di-tert-butyl-4-hydroxyphenyl)propionate)), for a process aid is stearic acid, for a coagent are high vinyl polybutadiene, triallyl isocyanurate (TAIC) or mixtures thereof, for a curative is di(tert-butylperoxyisopropyl)benzene like Perkadox 14/40.

For the formation of the first material $M_1$ or at least one of the further materials $M_x$ from the above mentioned ingredients, all of the selected materials are preferably mixed either on a two-roll mill or with an internal mixer. Preferably, mixing is done by the use of an internal mixer. This is done to improve the quality of the finished compound while also significantly reducing the typical mix times incurred when done on a two-roll mill. Typically, the materials are mixed in a two-pass process in an internal mixer where the first pass through the mixer withholds the cure chemicals and is typically dropped out of the mixer at material temperatures <200° C., preferred <180° C., or preferred <150° C. This, so called master batch is then run through the mixer a second time adding the cure chemicals that are typical radical regenerating species or sulfur donating materials well known to those skilled in the art which cause mostly irreversible curing (crosslinking) of the given highly viscous liquids when heated to their decomposition or activation temperature and again dropped from the mixer at material temperatures of <180° C., preferably <150° C., or preferably <120° C. Preferably, the curing chemicals are added at lower temperatures to avoid premature curing.

Milling of most of the described formulations (rubber compounds) can be performed without any extensive precautions. However, rubber compounds tend to build heat quickly; therefore, the use of full cooling capabilities is typically recommended. Preferably, for the first run of the mill the mill gap is set at approximately ¼ inch. It is preferred to ensure a shear action required to finish the mixing process while being thin enough to dissipate any excess heat generated during this process. The mill preferably is fed by a compound from an internal mixer which is positioned above the mill or by feeding a stored compound one sheet at a time to the ends of the mill. After banding the compound on the mill, cross-cutting the compound 5 to 7 times from each end is usually adequate to complete the milling process. Removing the milled compound from the mill can easily be accomplished via automatic systems or by hand.

Preferably, the curative is selected from the group consisting of peroxide or sulfur/sulfur-donor cure systems. Comparisons of sulfur/sulfur-donor and peroxide cured compounds indicate that peroxide curing provides better compression set and heat resistance. Depending on the choice of characteristics the three dimensional structure should have and depending on the choice of temperature and pressure to be applied during the inventive process, the choice of curative is influenced. Since peroxides have different molecular weights and decomposition temperatures, it is imperative to select the correct one based on the criteria noted above. Furthermore, the process ability and cost-effectiveness of producing the three dimensional structure is affected by the choice of materials. As in all peroxide cured material, vulcanization in the presence of oxygen causes reversion and thus can leave a sticky surface on the cured part which is used as an advantage for the inventive layering process, also called 3printing, of ultra-high viscosity liquid materials at room temperature (25° C.). However, for the final curing step cz) to produce the cured three dimensional structure, especially when using low pressure (<1.5 bar) conditions it is preferable to purge the building volume or surrounding with an inert gas, e.g. $N_2$, $CO_2$, Ar, prior to heating up for curing. Low double bond containing polymers like EPDM, ACM, HNBR when compared to SBR or NBR, the curing speed tends to be slower; therefore, to increase the curing speed a secondary curative is preferably employed in combination with the primary curative. Long curing times are required when thiazole based (MBTS) or sulfenamide-based (CBS, OBTS) primary curative are used. To speed up the curing process, a small quantity of guanidine-based (DPG) or thiuram-based (TMTM) as secondary curative is preferable in combination with the primary curative. Even when using a thiuram-based (TMTD, TETD) primary curative, the addition of a thiazole based (MBT) as secondary curative will shorten the time required for curing. The use of dithiocarbamate (ZEDC) as the primary curative is undesirable since the scorch time will be shortened.

Preferably, the three dimensional structure comprises the first material $M_1$ in an amount in a range of from 1 wt.-% to 100 wt.-%, or preferably in a range of from 2 to 99 wt.-%, or preferably in a range of from 5 to 90 wt.-%, or preferably in a range of from 10 to 80 wt.-%, referred to the total weight of the three dimensional structure.

Preferably, the three dimensional structure comprises the further material $M_x$ in an amount in a range of from 1 wt.-% to 99 wt.-%, or preferably in a range of from 2 to 95 wt.-%, or preferably in a range of from 5 to 90 wt.-%, or preferably in a range of from 10 to 80 wt.-%, referred to the total weight of the three dimensional structure. The amount of the further material $M_x$ with x ranging from 2 to 100 is the sum of all materials in the three dimensional structure formed in any of steps a) or b) differing from the first material $M_1$.

Preferably, at least two different materials, the first material $M_1$ and at least a second material $M_2$ are applied in step a) or layered in step b) to form the three dimensional structure. Preferably, at least one of the at least two materials selected from the group consisting of the first material $M_1$, the second material $M_2$, any further material $M_x$ with x ranging from 3 to 100, comprises a material which provides a Mooney viscosity of ≤10 ME at 60° C. before curing. Preferably, the three dimensional structure comprises the material providing a viscosity of ≤10 ME at 60° C. before curing in an amount in a range of from 0.1 to 90 wt.-%, or preferably in a range of from 1 to 80 wt.-%, or preferably in a range of from 5 to 70 wt.-%.

The three dimensional structure preferably provides a volume in a range of from 1 $mm^3$ to 1000 $m^3$, or preferably in a range of from 10 $mm^3$ to 500 $m^3$, or in a range of from 100 $mm^3$ to 50 $m^3$, or in a range of from 0.01 $m^3$ to 1 $m^3$.

The curing step c) can be established in any manner selected by a person skilled in the art which is appropriate for the inventive process. Curing, according to the invention means a raise of hardness of at least one of the materials applied or layered to the substrate of previous layer of at least 1 Shore A grade, or preferably of ate least 3 Shore A grades, or preferably of at least 5 Shore A grades, or preferably of ate least 10 Shore A grades, or preferably of at least 20 Shore A grades. The curing step c) can be started at any stage of the process. Preferably, the finish of the curing step c) is characterized by a raise of the hardness of the at least one material used to build the three dimensional structure in steps a) and b). Preferably, the raise of hardness during the curing step c) is in a range of from 1 to 90 Shore A grades, or preferably in a range of 3 to 70 Shore A grades, or preferably in a range of from 5 to 50 Shore A grades, or preferably in a range of from 10 to 40 Shore A. Preferably, the Mooney viscosity is reduced during the curing step c) by at least 30%, or preferably by at least 50%, or preferably by at least 70%, compared to the Mooney viscosity at 25° C. at at least one point of time during step c). The raise of hardness or the change of viscosity is preferably a result of a crosslinking process of molecules present in the first material $M_1$ or any of the further materials $M_x$. The crosslinking process may be the result of a chemical reaction resulting in a chemical crosslinking or of a physical interaction of the molecules present in the first material $M_1$ or any of the further materials $M_x$.

To execute the curing step c) any measure can be applied that provokes the aforementioned crosslinking process resulting in a change in hardness or viscosity. Preferably, at least one measure is applied to the applied or layered material which provokes the change of hardness as described before. The curing step c) preferably is split into at least two separate steps c1) and c2) which may be performed or initiated independently from each other. If step c) is mentioned the sum of all curing steps c1), c2) to cz), with z ranging from 3 to 10, is meant. The curing step c) preferably comprises at least one measure selected from the group consisting of heating, irradiating, applying humidity or a combination of at least two thereof. The heating is preferably performed at a temperature in a range of from 50 to 250 C. Heating can be performed by any means the person skilled in the art would select for heating a first material $M_1$ or any of the further materials $M_x$. Preferably, the heating is performed by means selected from the group consisting of applying hot air, warming up the surrounding of the materials e.g. the surface, placing a heat source above or below the surface or any combination of two thereof. The irradiating is preferably selected from the group consisting of IR-radiation, VIS and UV-radiation or a combination thereof. Curing or crosslinking by applying humidity may be performed by any means the person skilled in the art would select for humidifying the materials $M_1$ to $M_x$. Preferably, the humidity is applied via warm, humid air. The humidity of the air preferably is in a range of from 50 to 100% relative humidity, whereby the air has a temperature in a range of from 30 to 100° C. The measures may be applied simultaneously or successively.

Preferably, before or in the course of the curing step c) a selective attachment of powder particles to each other to form larger coherent aggregates is performed. The aggregates preferably have a module ≥0.1 MPas, or preferably ≥0.3 MPas, or preferably ≥0.5 MPas. The selection of those parts of the layer to form aggregates is preferably achieved according to a digital data file like STL, AMF, PLY, OBJ, X3D containing voxel by voxel and layer by layer build instructions. Preferably, the selected areas are treated by actinic radiation, thermal or chemical processes or combinations thereof. Preferably, the treatment of the selected areas results in consecutively building a 3D shaped structure. Preferably, at least part of the selective attachment to build the larger coherent aggregates of the powder particles is achieved via selective applications of at least one measure. The measure is preferably selected from the group consisting of applying glues, applying reactive glues, applying solvents, applying cross-linkers, applying photosensitizers or a combination of at least two thereof. The application of these measures is preferably performed on selected areas of the powder particles. The application of these measures is preferably performed via a method selected from any known and applicable printing technology. A selection of areas which should form larger coherent aggregates is preferably performed via an IR radiation on a selected part of the powder particles. Alternatively, a uniform radiation on the whole building platform of the selectively applied measures provoking a selective heating effect due to the selective application of said glues or solvents or cross-linkers or photosensitizers alone or in combination could be used to achieve a selection of those areas where aggregates should be formed.

The preferred application form of the formulated ultrahigh viscosity liquid will be selective sintering of powder material. Selective sintering is preferably performed by a laser.

In a preferred embodiment of the invention, the residence time at the processing temperature is ≤20%, or preferably ≤15%, or preferably ≤10% of the $t_{80}$ crosslinking time of the material. The $t_{80}$ crosslinking time describes the time where in a rheology experiment at a given temperature 80% of the final torque of the crosslinking material formulation is reached. The measurement of the $t_{80}$ time is preferably performed in a vulcanising rheometer which is preferably based on a moving die rheometer as for example the RheoCheck Profile-MD from Gibitre Instruments in Italy. The two crosslinking time is the time that is needed to achieve the maximum torque achievable in the respective curing step, for example in curing step c). In case of the use of sulfur based curing agents, a too long curing time may result in a reversion or reduction of the crosslinking density also observable as a reduction of the observable torque. Preferably, the process is performed where a reversion or reduction of the crosslinking density is avoided. If more than one curing step is performed in the process at least three different $t_{100}$ crosslinking times can be differentiated. One crosslinking time correlated to the first curing step c1) is called $t_{100c1}$, if necessary one crosslinking time related to the second curing step c2) is called $t_{100c2}$ and if necessary further crosslinking times for any of curing step cz). The total crosslinking time related to the sum of all crosslinking steps c1) to cz) is called $t_{100c}$.

Preferably, a second curing step c2) is performed after curing step c1). In the second curing step c2) the same or a different crosslinking reaction is performed than in the first curing step c2). Preferably, by performing the first curing step c1) 90%, or preferably 80%, or preferably 60%, or preferably 50% of the final crosslinking density of the three dimensional structure is achieved. Preferably, by performing the second curing step c2) 10%, or preferably 20%, or preferably 40%, or preferably 50% of the final crosslinking density of the three dimensional structure is achieved. In a preferred embodiment of the invention the curing is intentionally stopped before achieving the full cure. This is advantageous if for a selected material properties shall preferably be shifted in direction of lower hardness and higher elongation at break properties.

Preferably, the interfacial layer to layer tensile strength of the applied material after all curing steps is >20% preferably >30%, or preferably >40% compared to the tensile strength of the material formed and cured in a traditional forming process like injection molding. The comparative measurements are made on S2 tensile test members produced by the respective production methods, either according to the inventive 3D printing process or according to the injection molding process at 180° C. To compare the S2 tensile test members a tensile test in direction of layer to layer build according to DIN 53504 is performed.

Preferably, the cured first material $M_{1c}$ or the cured further $M_{xc}$ provides a hardness in a range of from 20 to 98 Shore A, or preferably in a range of from 30 to 95 Shore A, or preferably in a range of from 40 to 85 Shore A, or preferably in a range of from 50 to 80 Shore A. Preferably, the three dimensional structure provides a hardness in a range of from 20 to 95 Shore A, or preferably in a range of from 25 to 92 Shore A, or preferably in a range of from 30 to 90 Shore A, or preferably in a range of from 35 to 85 Shore A.

In a preferred embodiment of the invention the at least one further curing step c2) involves heating and/or irradiating. Ways of heating or irradiating have already been described in the context of curing step c1) which are also applicable for step c2). By heating or irradiating the materials a further crosslinking of the first material $M_1$ or the further material $M_x$ is triggered. In another preferred embodiment of the invention any of the further curing steps c2) to cz) involves humidity and or oxidative crosslinking of the first material $M_1$ or the further material $M_x$ which have already been cured in step c1). Humidity triggered crosslinking is preferably performed in the same manner as mentioned for curing step c1). Oxidative crosslinking is preferably an ambient temperature postcuring process, which preferably is performed as last curing step.

In another preferred embodiment various crosslinking mechanisms may be mixed.

To achieve chemical crosslinking of the material (and of $M_1$ to $M_x$) several methods are suitable for the inventive process. Well known in the rubber industry is crosslinking via sulfur or radical heat induced crosslinking mechanisms (see handbooks of the rubber technology/industry ([Bayer] Handbuch für die Gummi-Industrie. 2. völlig neu bearbeitete Auflage Gebundene Ausgabe—1991), (Rubber Technologist's Handbook, Volume 1, Sadhan K. De, Jim R. Whitei, Smithers Rapra Publishing, 2001)

Other crosslinking mechanisms may involve addition or condensation reactions like the reactions of amines with acids and anhydrides, amine addition to double bonds (Michael reaction), amine reaction with chlorides and bromides, epoxides; isocyanate reaction with water and Zeriwitinoff active hydrogen functions like hydroxy, amine, acids; isocyanate trimerisations and dimerizations, isocyanate reaction with epoxids, silane couplings, water crosslinking, oxidative crosslinking, ionic and hydrogen bonding etc. Furthermore, radiation induced curing via UV or IR activation of e.g. radical reactions, high power radiation activations, heat induced decomposition reactions leading to crosslinking radical reactions starting from peroxides and or diazo compounds and or thermally or photochemically instable (e.g. sterically strained) compounds and others well known to rubber materials. Also crosslinking mechanisms from the coatings and adhesive industries might be suitable for the chemical crosslinking of materials $M_1$ to $M_x$.

Preferably, the first material $M_1$ or at least one of the further materials $M_x$ comprise a reactive moiety that has a pot-life of >5 h, or preferably >24 h, or preferably >48 h at RT at dry conditions (less than 50% humidity). Preferably, the first material $M_1$ or any of the further materials $M_x$ are stored in a closed package. The pot-life is defined as the period until an increase of the Mooney viscosity MU of >50 MU at 100° C. is achieved.

In a preferred embodiment of the process the powder provides an average particle size in a range of from 10 to 5000 µm, or preferably in a range of from 50 to 1000 µm, or preferably in a range of from 100 to 500 µam.

In a preferred embodiment of the process the powder is produced by grinding at least one component of the first material $M_1$ or at least one component of the further material $M_x$ at a temperature of below 30° C., or preferably of below 15° C., or preferably of below 0° C. Preferably, grinding of the at least one component of the first material $M_1$ or at least one component of the further material $M_x$ is provided at a temperature in a range of from 30 to −100° C., or preferably in a range of from 10 to −98° C., or preferably in a range of from −10 to −95° C., or preferably in a range of from −20 to −90° C.

In a preferred embodiment of the process, the process provides at least one of the following features:
  I) the curing step c) is started independently for each layer $L_1$ to $L_y$ before, during or after one of the steps a) or b);
  II) step a) comprises a selective attachment step a');
  III) step b) comprises a selective attachment step b');
Preferably, the process provides at least two of the steps I) to III), or preferably all steps I) to III). Preferably, the process provides the steps I) and II), or preferably the steps I) and III), or preferably the steps II) and III). Preferably, the curing step c) is started for the first layer $L_1$ after step a) and for all following further layers $L_y$, with y ranging from 2 to 100000, after each of the y repetitions of step b). Preferably, the curing step c) for all layers $L_1$ to $L_y$ is started after all layering steps b) have been performed.

In a preferred embodiment of the process, wherein a least one of the used materials provides at least one of the following features:
  (1) at least one of the materials $M_1$ to $M_x$ has a Tg below 25° C., or preferably below 15° C., or preferably below 5° C., or preferably below 0° C., or preferably below −5° C. before and/or after curing step c); before and/or after curing step c);
  (2) at least one of the materials $M_1$ to $M_x$ has a molecular weight of 5 to 5000 kg/mol, or preferably in a range of from 10 to 1000 kg/mol, or preferably in a range of from 20 to 500 kg/mol, or preferably in a range of from 30 to 300 kg/mol as can be measured by gel permeation chromatography against Polystyrene as a standard;
  (3) at least one of the materials $M_1$ or $M_x$ or the three dimensional structure has an elongation at break of >30% after curing step c), or preferably of >40%, or preferably of >50% after curing step c);
  (4) at least one of the materials $M_1$ or $M_x$ experiences no phase transition (Tg or Tm) above 50° C., or preferably above 40° C., or preferably above 30° C. before and/or after curing step c);
  (5) at least one of the inventive materials has a Mooney viscosity of >10 ME at 60° C. and <200 ME at 100° C., or preferably of >20 ME at 60° C. and <190 ME at 100° C., or preferably of >50 at 60° C. and <150 ME at 100° C.

Preferably, the properties (1) and (3) are measured according to the methods described in the section Methods below. Preferably, the process provides any of the feature combination selected from the group consisting of (1), (2), (3), (4), (5), (1)+(2), (1)+(3), (1)+(4), (1)+(5), (2)+(3), (2)+(4), (2)+(5), (3)+(4), (3)+(5), (4)+(5), (1)+(2)+(3), (1)+(2)+(4), (1)+(2)+(5), (1)+(3)+(4), (1)+(3)+(5), (1)+(4)+(5), (2)+(3)+(4), (2)+(3)+(5), (2)+(4)+(5), (3)+(4)+(5), (1)+(2)+(3)+(4), (1)+(2)+(3)+(5), (1)+(2)+(4)+(5), (1)+(3)+(4)+(5), (2)+(3)+(4)+(5), (1)+(2)+(3)+(4)+(5).

Preferably, step a) or step b), or both are established in a building volume, wherein the building volume provides at least one of the following features:
  I. a building rate of >10 g/h, or preferably of >20 g/h, or preferably >30 g/h;
  II. a temperature in a range of rom 10 to 200° C., or preferably in a range of from 20 to 180° C., or preferably in a range of rom 30 to 150° C.;
  III. a dimension in a range of from 0.1 to 1000 m³, or preferably in a range of from 0.5 to 900 m³, or preferably in a range of from 1 to 500 m³;

Preferably, the building volume provides one, two or all of the features I) to III) in any combination of these features. The building volume may provide a volume with elevated or diminished pressure compared to normal pressure. Preferably, the substrate is movable relative to the walls of the building volume. Preferably, the precision of the movement of the substrate relative to the walls is in a range of from 0.01 to 10 mm, or preferably in a range of from 0.03 to 5 mm, or preferably in a range of from 0.05 to 1 mm. Preferably, a movement of the substrate or the walls relative to each other is performable in all three dimensions X, Y and Z separately, especially preferably in Z direction.

Preferably, at least a part of the building volume has a temperature in a range of from −100° C. to 400° C., or preferably in a range of from −60 to 350° C., or preferably in a range of from −40 to 300° C., or preferably in a range of from −10 to 250° C. at the substrate where the first material $M_1$ is applied to. Preferably, the viscosity of the heated first material $M_1$ or of the further material $M_x$ during processing and application to the substrate is in a range of from 1 to 150 ME at the maximum processing temperature, or preferably in a range of from 3 to 120 ME or preferably in a range of from 5 to 100 ME.

In a preferred embodiment of the process the hardness of the cured material $M_{1c}$ or $M_{xc}$ after step c) has increased by at least 5 Shore A points compared to the applied material $M_1$ in step a) or $M_x$ in step b) before curing. Preferably, the hardness of the cured material $M_{1c}$ or $M_{xc}$ after step c) has increased by at least 10 Shore A points, or preferably by at least 15 Shore A points, or preferably by at least 20 Shore A points compared to the applied material $M_1$ in step a) or the layered material $M_x$ in step b) before curing in step c) has started. Preferably, the curing in step c) provides a chemical crosslinking of the first material $M_1$ or of the further material M. The cured material $M_{1c}$ or $M_{xc}$ comprises curing induced chemical crosslinking of at least 0.01%, or preferably, of at least 0.05%, or preferably of at least 0.1% of the atoms of the respective material.

Preferably, the applying of the first material $M_1$ in step a) or the layering of the further material $M_x$ in step b) together with the selective attachment steps a') or b') is performed via an electronic control of at least one part selected from the group consisting of the application tools of powder and additional material, the movement of the substrate, the movement of the walls, the heating means, the energy application means and any combination of at least two thereof. Preferably, the movement of the substrate and the use of the energy application means are coordinated via the electronic control. Preferably, the electronic control is performed via a computing system. Preferably, a digital file with three dimensional data (3D data) of the three dimensional structure to be built is stored on the computing system. Preferably, according to the data of the digital file the movement of the application tool or the use and intensity of the energy application means or both is controlled and coordinated. Alternatively or additionally, a mechanical movement of the substrate or the application tool can be used to achieve the three dimensional structure. Preferably, the energy application means is activated after applying or layering of each layer $L_1$ to $L_y$ according to a predefined path in a predefined time slot.

In a preferred embodiment of the process the applying of at least one of the following steps is executed according to digital data related to the shape of the three dimensional structure which are established and provided by a computer aided process:
  the applying of material $M_1$ in step a);
  the selective attachment of at least a part of material $M_1$ in step a');
  the layering of material $M_x$ in step b);
  the selective attachment of at least a part of material $M_x$ in step b').

Preferably, all of the steps a), b), a') and b') are executed according to the digital data. As already described above, step a') is preferably part of step a) and therefore the applying of material $M_1$ is coordinated with the selective attachment step a') of the applied material $M_1$. The same applies to step b) and b'). Preferably, step b') is part of step b) and therefore the applying of material $M_x$ is coordinated with the selective attachment step b') of the applied material $M_x$.

The digital data to coordinate any of steps a), b), a') and b') might be provided in any form the person skilled in the art would select for the providing digital date. Preferably, the execution according to digital data is achieved by a digital 3D file selected from the group consisting of STL, AMF, PLY, OBJ, X3D or a combination of at least two thereof. Preferably, after the step a) or step b) in combination with the respective selective attachment step a') or b') the shape of the material $M_1$ or $M_x$ stays essentially unchanged. Essentially, unchanged according to the invention means that in each spatial direction the dimension of the material $M_1$ or $M_x$ does not vary more than 20%, or preferably not more than 10%, or preferably not more than 5% in each spatial direction, compared to the shape directly after the applying step a) or the layering step b). Preferably, after step a) or step b) in combination with the respective selective attachment step a') or b') the shape of the material $M_1$ or $M_x$ does not vary more than 2 mm, or preferably not more than in a range of from 0.1 to 2 mm, or preferably not more than in a range of from 0.3 to 1.5 mm, or preferably not more than 0.5 to 1 mm in each direction x, y or z.

The three dimensional structure produced according to the inventive process is a 3D shaped structure via a 3D printing process starting from ultra-high viscosity liquids at RT formulations including an application step including a selective attachment step controlled by a CAD data file and a consecutive and/or parallel crosslinking step in or outside the building volume. The three dimensional structure may be produced from one or many different materials $M_1$ to $M_x$ used simultaneously or intermixing or consecutively. The product may be built on any 3D or 2D shaped form or on a substrate from any other production process.

The three dimensional structure preferably incorporates rubbery properties. To provide a rubbery property at least one of the following properties has to be achieved for the main material used to build the three dimensional structure:
  [1] a Shore A hardness in a range of from 20 to 98 Shore A, or preferably in a range of from 30 to 90 Shore A, measured according to DIN 53505,

[2] a bending modulus, measured according to DIN EN ISO 178, of <1000 MPa, or preferably of <500 MPa

[3] an elongation at break of >30%, or preferably of >50% measured according to DIN 53504 with S2 samples,

[4] a low compression set as tested in DIN 53 517 of <80%, or preferably <60%, or preferably of <50% measured on a cylindrical test piece after 30 min relaxation at RT after compression by 25% for 24 h.

[5] a Tg below 25° C. preferred below 5° C.

[6] no phase transition above 50° C. preferred 40° C.

Preferably, the main material used to build the three dimensional structure has two, or preferably three, or preferably all of the features [1] to [4] in any possible combination.

Preferably, at least one of the Materials $M_1$ to $M_x$ has a chemical crosslinking density with an average molecular weight between crosslink points of >500 g/mol, or preferably of >1000 g/mol, or preferably of >5000 g/mol. Preferably, the chemical crosslinking density of one of the fully cured Materials $M_{1c}$ to $M_{xc}$ has a relation of chemical crosslinking density to entanglement crosslinking density of <2, or preferably of <1.5, or preferably of <1.

Preferably, at least one of the cured materials $M_1$ or $M_x$ shows a temperature dependent loss of modulus E' (MPa) measured in a DMA (as can be measured in e.g. a METTLER TOLEDO DMA 1) at shear rates of 1/s of less than 80%, or preferably of less than 70%, or preferably of less than 60%, based on the modulus E' at 25° C. when rising the temperature to 200° C.

Preferably, the process for producing the three dimensional structure includes a parallel printing of different materials from $M_1$ or $M_x$ as support materials that can be easily separated from the intended three dimensional structure before or after curing step c). Such different materials could be e.g. water soluble or low temperature melting polymers and waxes or non-reactive powders of in-organic materials like glass.

Preferably, the application tool or the substrate is arranged to be movable in at least one of the spatial directions X, Y or Z. Preferably, the precision of the movement of the application tool relative to the substrate in each of the spatial directions is in a range of from 0.001 to 5 mm, or preferably in a range of from 0.005 to 2 mm, or preferably in a range of from 0.01 to 1 mm. In another preferred embodiment the substrate will move in the form of linear XYZ displacements or rotational displacements where a simultaneous displacement of the substrate in one, two or all three spatial directions is possible. Preferably, the application tool and the substrate are arranged to be moved relative to each other. In a preferred embodiment of the invention the application tool and the substrate are moved in at least one direction X, Y, Z during at least a part of the process to build the three dimensional structure.

Preferably, the application tool is arranged to be movable in the spatial directions X and Y and the substrate is movable in Z direction.

Preferably, the application tool is moveable in Z direction and the substrate is movable in X and Y direction.

Preferably, the application tool is movable in Z and one other direction and the substrate is moveable in X and Y direction.

In a preferred embodiment of the process the first material M1 or at least one of the further materials Mx is compounded before step c) comprising 100 parts of an ultra-high viscosity polymer, 0 to 300 parts of an organic or inorganic filler, 0 to 150 parts of a plasticizer, 0 to 40 parts of a metal oxide or salt, 0 to 20 parts of an anti-degradent, 0 to 10 parts of process aids, 0 to 20 parts of coagent and 0.1 to 20 parts of a curative. To those skilled in the art a number of suitable compounding ingredients as described are known and can be found e.g. in Rubber Technologist's Handbook, volume 1, Sadhan K. De, Jim R. Whitei, Smithers Rapra Publishing, 2001.

Preferably, the first material $M_1$ or at least one of the further materials $M_x$ is compounded before step c) comprising 100 parts of an ultra-high viscosity polymer, 5 to 100 parts of an organic or inorganic filler, 0 to 100 parts of a plasticizer, 0 to 10 parts of a metal oxide or metal salt, 0 to 10 parts of an anti-degradent, 0 to 5 parts of a process aid, 0 to 10 parts of a coagent and 0.5 to 10 parts of a curative.

In a preferred embodiment of the process the three dimensional structure is cured in step c) at a temperature ≥ the temperature of the building volume where at least step a) or b) are performed.

Preferably, the three dimensional structure or the precursor of a three dimensional structure comprises at least two layers, wherein at least one layer comprises at least a first material $M_1$ or a further material $M_2$ or both, wherein at least one of the materials $M_1$ or $M_2$ has a Mooney viscosity of >10 ME at 60° C. and <200 ME at 100° C. Furthermore, in a preferred process to make the three dimensional structure with at least two different materials $M_1$ and $M_2$, the materials are applied by two different application tools.

A further aspect of the invention is a three dimensional structure resulting from the inventive process as described before. The three dimensional structure can have any shape or dimension which might be achieved by the afore described process.

In a preferred embodiment of the three dimensional structure the ratio of chemical crosslinking density to entanglement crosslinking density is in a range of from <2 to >0.05, or preferably of from <1.5 to >0.1, or preferably of from <1 to >0.2.

Preferably, materials $M_1$ or $M_x$ are further characterized by a crosslinking density after full curing which shows a ratio of chemical derived crosslinks to entanglement derived crosslinks of preferably <2, or preferably <1.5, or preferably <1.

In a preferred embodiment of the three dimensional structure the three dimensional structure has a dimension in a range of 1 mm*1 mm*1 mm to 2 m*2 m*10000 m.

In a preferred embodiment of the three dimensional structure as described before or produced according to the process according to the invention the three dimensional structure is at least a part of one of the following objects selected from the group consisting of a mattress, a seat, a shoe, a sole, an insole, a shoe sole, a helmet, a protector, a handle, a garment, a tire, a damper, a spring, a timing belt, a drive belt, a hose, a bearing, a bellow, an air spring, a wristlet, a sieve, a membrane, a sealing, an O-ring, a rubber tube, a gasket, a tube, a net, a rope, a protective suit or a combination of at least two thereof. Furthermore, preferably the three dimensional structure is at a part of one of the following objects selected from a mill cover, a roll cover, a fastener, a seal, a driving belt, a timing belt, a conveyor belt, a grip, a bumper, a thick structured coating, an elastic textile, a rubber glove and any other applications where rubber materials are materials of choice due to their specific properties or any combination of at least two thereof.

Preferably, the three dimensional structure according to the invention is a product wherein the product has dimensional variations in the X, Y or Z axis of not more than 5 times preferably not more than 20 times, or preferably not more than 50 times the thickness of the narrowest point of the thinnest layer applied in step a) or layered in step b).

The first material $M_1$ or the further material $M_x$ which is preferred for use in an additive manufacturing process as described before provides at least one of the following features:
  i. a Mooney viscosity of >10 ME at 60° C. and of <200 ME at 100° C.;
  ii. a glass point ($T_g$) below 25° C.;
  iii. a glass point ($T_g$) below 5° C.;
  iv. a glass point ($T_g$) below −5° C.;
  v. the ability to be cured at a temperature above $T_g$.
  vi. comprises an ultra-high viscosity material with a mean molecular weight in a range of from 5 to 5000 kg/mol, or preferably in a range of from 10 to 1000 kg/mol, or preferably in a range of from 50 to 500 kg/mol.

METHODS

1. Mooney viscosity: the Mooney viscosity is measured according to DIN 53523. The Mooney viscosity is measured according to DIN 53523, with the large rotor, 1 min preheating and 4 min measurement interval, known in the prior art as ML 1+4.
2. Shear viscosity: the shear viscosity is measured in a Wells/Brookfield cone-plate-viscosimeter at a shear rate of 1/s at 25° C.
3. Hardness: The Shore A hardness is measured according to DIN 53505.
4. Bending modulus: the bending modulus is measured according to DIN EN ISO 178.
5. Tensile testing: The tensile strength, tensile modulus and elongation at break are measured according to DIN 53504.
6. Compression set: The compression set is measured according to DIN 53517.
7. Glass transition temperature $T_g$: The $T_g$ is measured according to DIN 53765.
8. Chemical crosslinking density/entanglement crosslinking density: The chemical crosslinking density and ratio of entanglement crosslinks compared to chemical crosslinking density can be conveniently assessed by using Flory-Rhener theory for equilibrium swelling of crosslinked networks in ideal solvents in combination with mechanical stress-strain testing. This method is described in detail in: Polymer, Volume 30, Issue 11, November 1989, Pages 2060-2062
9. Temperature dependent modulus E': is measured between 25° C. and 200° C. in a DMA (dynamic mechanical analysis) https://en.wikipedia.org/wiki/Dynamic_mechanical_analysis, at shear rates of 1/s e.g. with a METTLER TOLEDO DMA 1.
10. Torque: The measurement of the $t_{80}$ and $t_{100}$ time and corresponding torque is preferably performed on a vulcanising rheometer which is preferably based on a moving die rheometer according to a Vulkameter curing test at 200° C. according to DIN 53529 using a Visco-Elastograph from Göttfert.

Expected Results

In Table 1 together with the explanatory passage below, the general expected behavior of inventive compositions and non-inventive compositions has been listed.

TABLE 1

Examples of inventive compositions* to form material $M_1$ or $M_x$ and non-inventive compositions

| Ingredients phr | Nitril rubber (NBR)* | Polychloroprene (CR)* rubber | Ethylen propylen (EPDM)* rubber | Ethylen-vinylacetate (EVA)* rubber | Thermoplastic urethane (TPU) | Engineering Thermoplast (ABS) | Engineering Thermoplast PA12 |
|---|---|---|---|---|---|---|---|
| Polymer | 100 | 100 | 100 | 100 | 100 | 100 | 100 |
| Filler | | | | | | | |
| Filler | 200 | 100 | 200 | 150 | | | |
| Plasticizer | 5 | 5 | 10 | 5 | | | |
| Metal Oxide | 2 | 2 | 2 | 2 | | | |
| Anti-degradents | 1 | 1 | 1 | 1 | | | |
| Process Aids | 0.5 | 0.5 | 0.5 | 0.5 | | | |
| Coagent | 1 | 1 | 5 | 5 | | | |
| Curative | 2 | 2 | 8 | 8 | | | |

*inventive examples

The non-inventive samples could not be processed like the inventive samples because they resulted uniformly in non-sintered powders after being treated in the SLS printer which had been used for the inventive samples as described before. Comparative samples produced according to suitable 3D printing technologies showed significantly different properties compared to the inventive samples especially with regards to change of properties in a DMA test of the materials between 25° C. and 200° C. as disclosed under Methods, since all comparative materials melted (TPU, ABS, PA12) and/or changed dramatically in their E'modulus whereas the inventive materials kept their shape and experienced only a limited reduction of their modulus.

EXPERIMENTAL PART

All necessary materials to compose the first material $M_1$ or any of the further materials $M_2$ to $M_x$ were mixed in a two-step process, first in a 1.5 l internal mixer at 40° C. mixer temperature and secondly on a standard lab scale 2 roll mixer of company Vogt Labormaschinen GmbH at 20° C. roll temperature. First the ultra-high viscosity liquid listed in table 2 was plasticized in the internal mixer. After that, the further ingredients listed in table 2 were added starting with filler, then plasticizer, then Metal Oxide, then process aid, then coagent and finally curative. The overall 2 step process took up to 30 minutes. The addition of the ingredients was performed in such a way that optimal distribution of the ingredients was ensured as known in the art. The temperature of the material did not exceed 100° C. during the mixing process.

The inventive compositions according to table 2 were further processed on the roll to achieve 2 mm thin sheets of rubber formulations which were then processed and tested according to standard rubber methods, e.g. Mooney viscosity, vulcanization testing, pressure vulcanization of S2 test specimen, tensile testing, Shore A measurements. Further the material was used for providing feedstock for the process for producing a three dimensional structure, also called 3D printing process, as described below.

All inventive formulations have been purchased from Lanxess AG, Germany as ready mixed compounds.

All comparative materials where purchased as Polyamide particles from Hunan Farsoon High-tech Co., Ltd named Polyamide FS 3300 PA, and used without further treatment.

TABLE 2

Examples of inventive compositions/compounds (*) to build material 1* corresponding to $M_1$, 2* corresponding to $M_2$ to 5* corresponding to $M_5$

| Example | | 1* $M_1$ | 2* $M_2$ | 3* $M_3$ | 4* $M_4$ | 5* $M_5$ |
|---|---|---|---|---|---|---|
| | Ingredients phr [parts per hundred rubber] | | | | | |
| THERBAN AT 3404 | | 100 | | | | |
| PERBUNAN 2831 F | | | 100 | | | |
| LEVAPREN 600 | | | | 100 | | |
| BAYPREN 210 | | | | | 100 | |
| KELTAN 2470L | | | | | | 100 |
| CORAX N 550/30 | | 30 | 30 | 30 | 30 | 30 |
| SUNPAR 2280 | | | | | | 5 |
| UNIPLEX 546 | | 5 | 5 | 5 | 5 | |
| RHENOFIT DDA-70 | | 1.4 | 1.4 | 1.4 | 1.4 | 1.4 |
| VULKANOX ZMB2/C5 | | 0.4 | 0.4 | 0.4 | 0.4 | 0.4 |
| MAGLITE DE | | 2 | 2 | 2 | 2 | 2 |
| ZINKOXYD AKTIV | | 2 | 2 | 2 | 2 | 2 |
| PERKADOX 14-40 B-PD | | 7 | 2 | 7 | 1.5 | 7 |
| KETTLITZ-TAIC | | 1.5 | | 1.5 | | 1.5 |
| The ingredients were compounded to achieve compounds 1* ($M_1$) to 5* ($M_5$). This was achieved by the following steps: | | | | | | |
| Compounding Mixing | | 1* | 2* | 3* | 4* | 5* |
| calculated density | g/cmm | 1.182 | 1.177 | 1.252 | 1.388 | 1.107 |
| Mixing steps | | | | | | |
| Internal mixer 1.5 liter volume | | | | | | |
| Mixing Step Parameters | | 1 | 1 | 1 | 1 | 1 |
| RPM: | 1/min | 40 | | | | |
| Stamp pressure: | bar | 8 | | | | |
| Temperature | [° C.]: | 40 | | | | |
| Roll mixer as mentioned above | | | | | | |
| Mixing Step Parameters | | 2 | 2 | 2 | 2 | 2 |
| RPM | 1/min | 20 | | | | |
| Temperature | [° C.] | 30 | | | | |
| Vulcanisation | | 1* | 2* | 3* | 4* | 5* |
| Moving-Die-Rheometer (MDR2000E) | | | | | | |
| Nr Parameter | | 1 | 2 | 3 | 4 | 5 |
| Test temperature | ° C. | | | 180 for all samples | | |
| Test time | min | | | 30 for all samples | | |
| Torque minimum | [Nm] | 0.54 | 0.67 | 0.21 | 1.29 | 0.62 |
| Torque maximum | [Nm] | 17.77 | 19.23 | 16.9 | 23.22 | 28.81 |
| Torque end | [Nm] | 17.62 | 19.21 | 16.83 | 23.21 | 28.78 |
| T 10% | [sec] | 47.33 | 41.28 | 36.85 | 36.02 | 47.75 |
| T 25% | [sec] | 76.53 | 65.3 | 49.04 | 58.29 | 75.53 |
| T 30% | [sec] | 86.63 | 73.98 | 53.39 | 67.28 | 85.51 |
| T 50% | [sec] | 134.33 | 116.55 | 78.45 | 112.35 | 134.95 |
| T 70% | [sec] | 205.83 | 183.36 | 129.99 | 181.83 | 215.3 |
| T 80% | [sec] | 263.82 | 238.68 | 178.86 | 255.24 | 282.96 |
| T 90% | [sec] | 365.82 | 337.92 | 268.86 | 439.62 | 403.53 |

TABLE 2-continued

Examples of inventive compositions/compounds (*) to build material 1* corresponding to M₁, 2* corresponding to M₂ to 5* corresponding to M₅

|  |  | 1* | 2* | 3* | 4* | 5* |
|---|---|---|---|---|---|---|
| T 95% | [sec] | 467.31 | 446.52 | 361.53 | 725.01 | 528.63 |
| tan D end | [rad] | 0.04 | 0.02 | 0.02 | 0.02 | 0.01 |
| Example |  | 1* | 2* | 3* | 4* | 5* |
| Mooney (viscosity) ML1 + 4 |  |  |  |  |  |  |
| Rotor | L |  |  |  |  |  |
| Preheating | min | 1 |  |  |  |  |
| Time to measure | min | 4 |  |  |  |  |
| Temperature | ° C. | 60 |  |  |  |  |
| ML 1 + 4 | ME | 142 | 96 | 74 | 11376 |  |
| Example |  | 1* | 2* | 3* | 4* | 5* |
| Mooney (viscosity) ML1 + 4 |  |  |  |  |  |  |
| Rotor | L |  |  |  |  |  |
| Preheating | min | 1 |  |  |  |  |
| Time to measure | min | 4 |  |  |  |  |
| Temperature | ° C. | 100 |  |  |  |  |
| ML 1 + 4 | ME | 52 | 40 | 27 | 60 | 36 |
| DSC −100 to 200° C., 20° C./min |  |  |  |  |  |  |
| Tg before cure | ° C. | −31.5 | −40.4 | −32.9 | −43.0 | −45.1 |
| Tm before cure | ° C. | — | — | — | 39.8*[1] | 44.3*[1] |
| Start of vulcanisation | ° C. | 140 | 150 | 145 | 140 | 140 |
| Tg after cure | ° C. | −30.2 | −37.4 | −29.5 | −41.3 | −42.1 |
| Tm after cure | ° C. | — | — | — | — | — |
|  |  | 1 | 2 | 3 | 4 | 5 |
| cure temperature | ° C. | 180 | 180 | 180 | 180 | 180 |
| press actual time | min | 12 | 12 | 12 | 12 | 12 |
| hardness and tensile strength @ RT (test combbination) | | | | | | |
| Density | g/ccm | 1.2 | 1.2 | 1.2 | 1.4 | 1.1 |
| M10 | MPa | 0.5 | 0.5 | 0.4 | 0.6 | 0.6 |
| M25 | MPa | 0.8 | 1 | 0.9 | 1.1 | 1.1 |
| M50 | MPa | 1.2 | 1.6 | 1.6 | 1.8 | 1.7 |
| M100 | MPa | 2.4 | 3.5 | 4.3 | 3.9 | 3.8 |
| M300 | MPa | 16.3 | — | — | — | — |
| elongation at break | % | 371 | 187 | 215 | 230 | 199 |
| tensile strength | MPa | 22.2 | 9.9 | 15.7 | 16.3 | 13.7 |
| hardness ShA | vulcanized | 57 | 61 | 58 | 66 | 66 |
| hardness ShA | unvulcanized | 11 | 5 | 9 | 36 | 21 |

*[1]only small peaks indicating crystalline content ≤10%/weight of formulation. Peaks disappear after curing.
curing - rubber -- test sheets comparative results of standard rubber manufacture, pressure vulcanized sheets used to cut out tensile test pieces.

For 3D printing via selective laser sintering the materials processed as described above where grinded using liquid nitrogen using a cryogrinding equipment GSM 250 from ACU-Pharma. Processing of formulated inventive compounds yielded ca. 20% of powdered rubber compounds (by weight) with medium particle sizes <0.5 mm as filtered through a 0.5 mm sieve. The thus received particles where dusted in ca. 2% of talcum and slowly brought to 23° C. temperature to prevent agglomeration.

To form articles by laser sintering of the inventive materials $M_1$ to $M_5$ (also referred to as 1* to 5*) each 12 g of the formulations where gathered in an aluminum vessel of 60 mm diameter and 8 mm depth, the powder was casted and subsequently pressed into a smooth surface and sintered at 23° C. in a SLS printer of Sharebot S.r.l., Italy of the type Snow White. Round shapes of 20 mm diameter and one layer where printed at room temperature. The laser energy of the used $CO_2$ laser was 6.3 W Scanning speed was 1.8 m/s and hatch distance was 0.1 mm. This is equivalent to an energy amount per run of 0.035 J/mm². To achieve stable shapes of 20 mm diameter 5 laser runs for the inventive sample was needed at a building room temperature of 23° C. The sintered one layer test pieces where gathered with a pincer and cleaned carefully by a medium hard brush from non sintered particles. Afterwards the test pieces where put into a hot air oven and vulcanized for 10 min at 200° C. to achieve a vulcanized test piece of ca. 2 mm thickness and 20 mm diameter. On the sintered particles density and hardness measurements where performed. Results are shown in table 2 and table 3. Inventive samples are marked by *. Inventive and comparative samples where tested under the same conditions.

TABLE 3

| Samples: | | |
|---|---|---|
| Inventive compound | 5* ($M_5$) | |
| Comparative sample | | FS 3300 PA |
| Test specimen 20 mm diameter sintered | yes | yes |
| Hardness (Shore A/D) | A: 20 | D: 72 |
| Density kg/l | 0.3 | 0.9 |
| Vulcanisation 10 min at 200° C. | | |
| Shape survived | yes | no |
| Hardness (Shore A/D) | A: 59 | D: 72 |

Surprisingly, the inventive sample forms a stable shape after sintering and keeps this shape after vulcanizing while at the same time curing to a mechanically typical rubber material. Also, it could be shown that the sub sequential post curing is a vital process step to achieve the desired properties. On the other hand the inventive process applied to non inventive materials does not yield satisfying results even using the most well known standard laser sintering material PA 12 (FS3300 PA).

Further the comparative example shows distinctly different processing behaviors compared to the inventive examples and printing procedures and significantly inferior product behavior after 3D printing especially regarding change of E-modulus with temperature between 25° C. and 150° C. (no rubber plateau, and a phase transition).

The invention claimed is:

1. A process for producing a three dimensional structure, the process including at least the following steps
   a) applying of at least a first material $M_1$ onto a substrate to build a first layer $L_1$ on the substrate;
   b) layering of at least one further layer $L_y$ of the first material $M_1$ or of a further material $M_x$ onto the first layer $L_1$, wherein the at least one further layer $L_y$ covers the first layer $L_1$ and/or previous layer $L_{y-1}$ at least partially to build a precursor of the three dimensional structure;
   c) curing the precursor to achieve the three dimensional structure;

wherein at least one of the materials $M_1$ or $M_x$ provides a Mooney viscosity of >10 ME at 60° C. and of <200 ME at 100° C. before curing, wherein at least one of the materials, the first material $M_1$ or the further material $M_x$ is a powder, wherein the powder comprises a plurality of powder components compounded together to form a compounded powder material that is compounded before step c).

2. The process according to claim 1, wherein the powder provides an average particle size in a range of from 10 to 5000 μm.

3. The process according to claim 1, wherein the powder is produced by grinding at least one component of the first material $M_1$ or at least one component of the further material $M_x$ at a temperature of below 30° C.

4. The process according to claim 1, wherein the process provides at least one of the following features:
   I) the curing step c) is started independently for each layer $L_1$ to $L_y$ before, during or after one of the steps a) or b);
   II) step a) comprises a selective attachment step a");
   III) step b) comprises a selective attachment step b").

5. The process according to claim 1, wherein at least one of the used materials provides at least one of the following features:
   (1) at least one of the materials $M_1$ or $M_x$ has a Tg below 25° C. before and/or after curing step c);
   (2) at least one of the materials $M_1$ or $M_x$ has a molecular weight of 5 to 5000 kg/mol;
   (3) at least one of the materials $M_1$ or $M_x$ or the three dimensional structure has an elongation at break of >30% after curing step c);
   (4) at least one of the materials $M_1$ or $M_x$ experiences no phase transition (Tg or Tm) above 50° C. before and/or after curing step c);
   (5) at least one of the materials $M_1$ or $M_x$ has a Mooney viscosity of >10 ME at 60° C. and <200 ME at 100° C.

6. The process according to claim 1, wherein the hardness of the cured material $M_{1c}$ or $M_{xc}$ after step c) has increased by at least 5 Shore A points compared to the applied material $M_1$ in step a) or $M_x$ in step b) before curing.

7. The process according to claim 1, wherein at least one of the following steps is executed according to digital data related to the shape of the three dimensional structure which are established and provided by a computer aided process:
   the applying of material $M_1$ in step a);
   the selective attachment of at least a part of material $M_1$ in a step a");
   the layering of material $M_x$ in step b);
   the selective attachment of at least a part of material $M_x$ in a step b").

8. The process according to claim 1, wherein the compounded powder material comprises 100 parts of an ultra-high viscosity polymer, 0 to 300 parts of an organic or inorganic filler, 0 to 150 parts of a plasticizer, 0 to 40 parts of a metal oxide, 0 to 20 parts of an anti-degradant, 0 to 10 parts of process aids, 0 to 20 parts of coagent and 0.1 to 20 parts of a curative.

9. The process according to claim 1, wherein the three dimensional structure is cured in step c) at a temperature≥the temperature of the building volume where at least step a) or step b) are performed.

10. A three dimensional structure resulting from the process of claim 1.

11. The three dimensional structure according to claim 10, wherein the three dimensional structure provides a ratio of chemical crosslinking density to entanglement crosslinking density of <2.

12. The three dimensional structure according to claim 10, wherein the three dimensional structure has a dimension in a range of 1 mm*1 mm*1 mm to 2 m*2 m*10000 m.

13. The three dimensional structure according to claim 10 or produced according to a process according to claim 1, wherein the three dimensional structure is at least a part of one of the following objects selected from the group consisting of a mattress, a seat, a shoe, a sole, an insole, a shoe sole, a helmet, a protector, a handle, a garment, a tire, a damper, a timing belt, a drive belt, a hose, an air spring, a wristlet, a sieve, a membrane, a sealing, an O-ring, a gasket, a tube, a net, a rope, a protective suit or a combination of at least two thereof.

14. The process according to claim 1, wherein the compounded powder material is compounded before step a) or b).

15. The process according to claim 1, wherein the compounded powder material is ground to achieve an average particle size in a range of from 10 to 5000 μm.

16. The process according to claim 15, wherein the compounded powder material is ground via cryogenic grinding.

17. The process according to claim 1, wherein the plurality of powder components comprises powder components having different average powder particle diameters.

18. The process according to claim 1, wherein the powder comprises less than 1 wt % water, based on a total weight of the material forming the powder.

* * * * *

UNITED STATES PATENT AND TRADEMARK OFFICE
CERTIFICATE OF CORRECTION

| | |
|---|---|
| PATENT NO. | : 11,472,101 B2 |
| APPLICATION NO. | : 16/333276 |
| DATED | : October 18, 2022 |
| INVENTOR(S) | : Dirk Achten et al. |

It is certified that error appears in the above-identified patent and that said Letters Patent is hereby corrected as shown below:

In the Claims

Column 29, Line 36 and 37, should read as follows:
II) step a) comprises a selective attachment step a′);
III) step b) comprises a selective attachment step b′).

Column 30, Line 7, should read as follows:
in a step a′);

Column 30, Line 10, should read as follows:
in a step b′).

Signed and Sealed this
Twenty-ninth Day of November, 2022

Katherine Kelly Vidal
*Director of the United States Patent and Trademark Office*